(12) United States Patent
Leonard et al.

(10) Patent No.: US 8,397,207 B2
(45) Date of Patent: Mar. 12, 2013

(54) LOGICAL STRUCTURE DESIGN SURFACE

(75) Inventors: Arthur C. Leonard, Redmond, WA (US); Pavel R. Karimov, Redmond, WA (US); Timothy E. Getsch, Redmond, WA (US); Michael J. McCormack, Snohomish, WA (US); Michael Tucker, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1287 days.

(21) Appl. No.: 11/944,792

(22) Filed: Nov. 26, 2007

(65) Prior Publication Data
US 2009/0138845 A1   May 28, 2009

(51) Int. Cl.
G06F 9/44 (2006.01)
(52) U.S. Cl. .................. 717/100; 717/109; 717/113
(58) Field of Classification Search .............. None
See application file for complete search history.

(56) References Cited

U.S. PATENT DOCUMENTS

| | | | |
|---|---|---|---|
| 5,546,519 A * | 8/1996 | Berry ........................... 715/763 |
| 5,623,591 A | 4/1997 | Cseri et al. |
| 6,105,043 A * | 8/2000 | Francisco et al. ............. 715/234 |
| 6,184,880 B1 * | 2/2001 | Okada .......................... 715/704 |
| 6,590,589 B1 * | 7/2003 | Sluiman et al. ............... 715/751 |
| 6,630,943 B1 * | 10/2003 | Nason et al. .................. 715/746 |
| 6,728,762 B1 * | 4/2004 | Estrada et al. ................ 709/218 |
| 6,748,425 B1 * | 6/2004 | Duffy et al. .................. 709/217 |
| 6,839,669 B1 * | 1/2005 | Gould et al. .................. 704/246 |
| 6,851,089 B1 | 2/2005 | Erickson et al. |
| 6,892,359 B1 * | 5/2005 | Nason et al. .................. 715/788 |
| 6,990,636 B2 * | 1/2006 | Beauchamp et al. .......... 715/764 |
| 7,110,936 B2 * | 9/2006 | Hiew et al. ...................... 703/22 |
| 7,117,447 B2 | 10/2006 | Cobb et al. |
| 7,246,344 B1 * | 7/2007 | Christensen et al. ......... 717/113 |
| 7,464,366 B2 * | 12/2008 | Shukla et al. ................. 717/100 |
| 7,475,289 B2 * | 1/2009 | Rosaria et al. ............... 714/38.1 |
| 7,533,367 B2 * | 5/2009 | Balsiger et al. ............... 717/109 |
| 2002/0077823 A1 | 6/2002 | Fox et al. |
| 2002/0099456 A1 * | 7/2002 | McLean .......................... 700/83 |
| 2002/0109717 A1 * | 8/2002 | Li et al. ........................ 345/744 |
| 2003/0110503 A1 * | 6/2003 | Perkes ............................ 725/86 |

(Continued)

OTHER PUBLICATIONS

Andrew Begel, "LogoBlocks A Graphical Programming Language for Interacting with the World", MIT Media Laboratory, May 1996, <http://research.microsoft.com/en-us/um/people/abegel/mit/begel-aup.pdf> pp. 1-23.*

(Continued)

*Primary Examiner* — Thuy Dao
*Assistant Examiner* — Samuel Hayim
(74) *Attorney, Agent, or Firm* — Merchant & Gould

(57) ABSTRACT

Embodiments are provided for displaying components for visually designing logical structures or macros. In one embodiment, a logical surface component is displayed which may include a design surface. The design surface may be utilized to display data which make up one or more macros. The design surface may be selected for receiving macro data. The received data, which represents a macro design, may then be displayed in the design surface on a display device. In another embodiment, controls for navigating within logical surface components utilized for designing macros may be displayed on a display device. A logical surface component which includes a hierarchical grouping of macro actions may be displayed. One more actions may be selected and an instruction may be received in a visual interface to move selected actions among the hierarchical grouping. In response to receiving the move instruction, the selected actions which were moved may be displayed.

19 Claims, 7 Drawing Sheets

U.S. PATENT DOCUMENTS

| | | | | |
|---|---|---|---|---|
| 2003/0197733 | A1* | 10/2003 | Beauchamp et al. | 345/764 |
| 2003/0200533 | A1* | 10/2003 | Roberts et al. | 717/124 |
| 2003/0210272 | A1* | 11/2003 | D'Souza | 345/773 |
| 2004/0070612 | A1* | 4/2004 | Sinclair et al. | 345/762 |
| 2004/0133878 | A1* | 7/2004 | Cole et al. | 717/115 |
| 2004/0150652 | A1 | 8/2004 | MacInnis et al. | 345/589 |
| 2004/0172621 | A1* | 9/2004 | Guillorit | 717/120 |
| 2004/0221262 | A1* | 11/2004 | Hampapuram et al. | 717/113 |
| 2005/0015745 | A1* | 1/2005 | Wain et al. | 717/113 |
| 2005/0015746 | A1* | 1/2005 | Shukla et al. | 717/113 |
| 2005/0034106 | A1* | 2/2005 | Kornerup et al. | 717/132 |
| 2005/0060685 | A1* | 3/2005 | Franz et al. | 717/109 |
| 2005/0114867 | A1* | 5/2005 | Xu et al. | 719/318 |
| 2005/0138614 | A1* | 6/2005 | Nelson et al. | 717/162 |
| 2005/0149870 | A1* | 7/2005 | Van Ee et al. | 715/700 |
| 2005/0154999 | A1* | 7/2005 | Wugoski | 715/827 |
| 2005/0160400 | A1* | 7/2005 | Pepin | 717/100 |
| 2005/0216887 | A1* | 9/2005 | Robertson et al. | 717/113 |
| 2005/0235260 | A1 | 10/2005 | Matsutsuka et al. | |
| 2005/0257193 | A1 | 11/2005 | Falk et al. | |
| 2005/0257196 | A1* | 11/2005 | Hollander et al. | 717/115 |
| 2006/0074730 | A1 | 4/2006 | Shukla et al. | |
| 2006/0074732 | A1* | 4/2006 | Shukla et al. | 705/8 |
| 2006/0074736 | A1* | 4/2006 | Shukla et al. | 705/8 |
| 2006/0075352 | A1 | 4/2006 | Burke et al. | |
| 2006/0101390 | A1 | 5/2006 | Lasker et al. | |
| 2006/0107224 | A1 | 5/2006 | Friend et al. | |
| 2006/0143572 | A1* | 6/2006 | Scott et al. | 715/765 |
| 2006/0150148 | A1* | 7/2006 | Beckett et al. | 717/109 |
| 2006/0190844 | A1 | 8/2006 | Binder et al. | |
| 2006/0206856 | A1 | 9/2006 | Breeden et al. | |
| 2007/0005562 | A1 | 1/2007 | Chau et al. | 707/2 |
| 2007/0276689 | A1* | 11/2007 | Slone et al. | 705/1 |
| 2008/0126394 | A1* | 5/2008 | Jain et al. | 707/102 |

OTHER PUBLICATIONS

Michael Gorlick et al., "Visual Programming-in-the-Large versus Visual Programming-in-the-Small", IEEE, 1994, <http://ieeexplore.ieee.org/stamp/stamp.jsp?tp=&arnumber=363631> pp. 137-144.*

Martin C. Carlisle et al., "RAPTOR: A Visual Programming Environment for Teaching Algorithmic Problem Solving", SIGCSE, 2005, <http://delivery.acm.org/10.1145/1050000/1047411/p176-carlisle.pdf> pp. 176-180.*

Brian A. Randell and Rokford Lhotka: Bridge the Gap Between Development and Operations with Whitehorse, Visual Studio 2005, pp. 1-9. http://msdn.microsoft.com/msdnmag/issues/04/07/whitehorse/default.aspx.

Supplementary European Search Reach Report issued Nov. 15, 2010 in EP08853636.

PCT Search Report mailed Aug. 27, 2009 in PCT/US2008/082950 Application, pp. 1-11.

* cited by examiner

LOGICAL STRUCTURE DESIGN SURFACE

BACKGROUND

Computer users may automate various software application tasks through the use of one or more logical structures or macros to automate various software applications tasks. For example, a user may desire to open a data entry form when a button is clicked. The user may automate this process in the application by a series of statements or commands using a programming language (e.g., a macro language). The series of statements or commands may thus comprise a macro.

Typically, application software automation tasks require the utilization of a text editor application to create automation statements in a high-level programming language such as a macro language. In some instances, a grid-based design application in which macro statements are typed into a grid section may be utilized. However, both of the aforementioned implementations for automating software application tasks suffer from a number of drawbacks. Once drawback is that in many cases, each automation statement must be repeated for each line in the macro that the macro statement is to be evaluated against, which may make macro design time consuming as well as tedious. For example, an If statement utilized in a macro language may need to be copied or typed multiple times to generate a message box and to stop the macro. Another drawback associated with macro design applications are that they do not provide an interface to visually represent complex macros to enable users to visually understand a logical flow, thus making these applications difficult to use for non-expert designers. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for displaying logical surface components for visually designing logical structures or macros. In one embodiment, a first logical surface component is displayed which may include a design surface. The design surface may be utilized to display data which make up one or more macros. The design surface may be selected for receiving logical structure or macro data. The received data, which represents a design of one or more logical structures or macros, may then be displayed in the design surface on a display device. In another embodiment, controls for navigating within logical surface components utilized for designing one or more logical structures or macros may be displayed on a display device. A logical surface component which includes a hierarchical grouping of logical surface or macro actions may be displayed. One more actions may be selected and an instruction may be received in a visual interface to move selected actions from a first location among the hierarchical grouping to a second location among the hierarchical grouping. In response to receiving the move instruction, the selected actions at the second location may be displayed.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Figure 1:
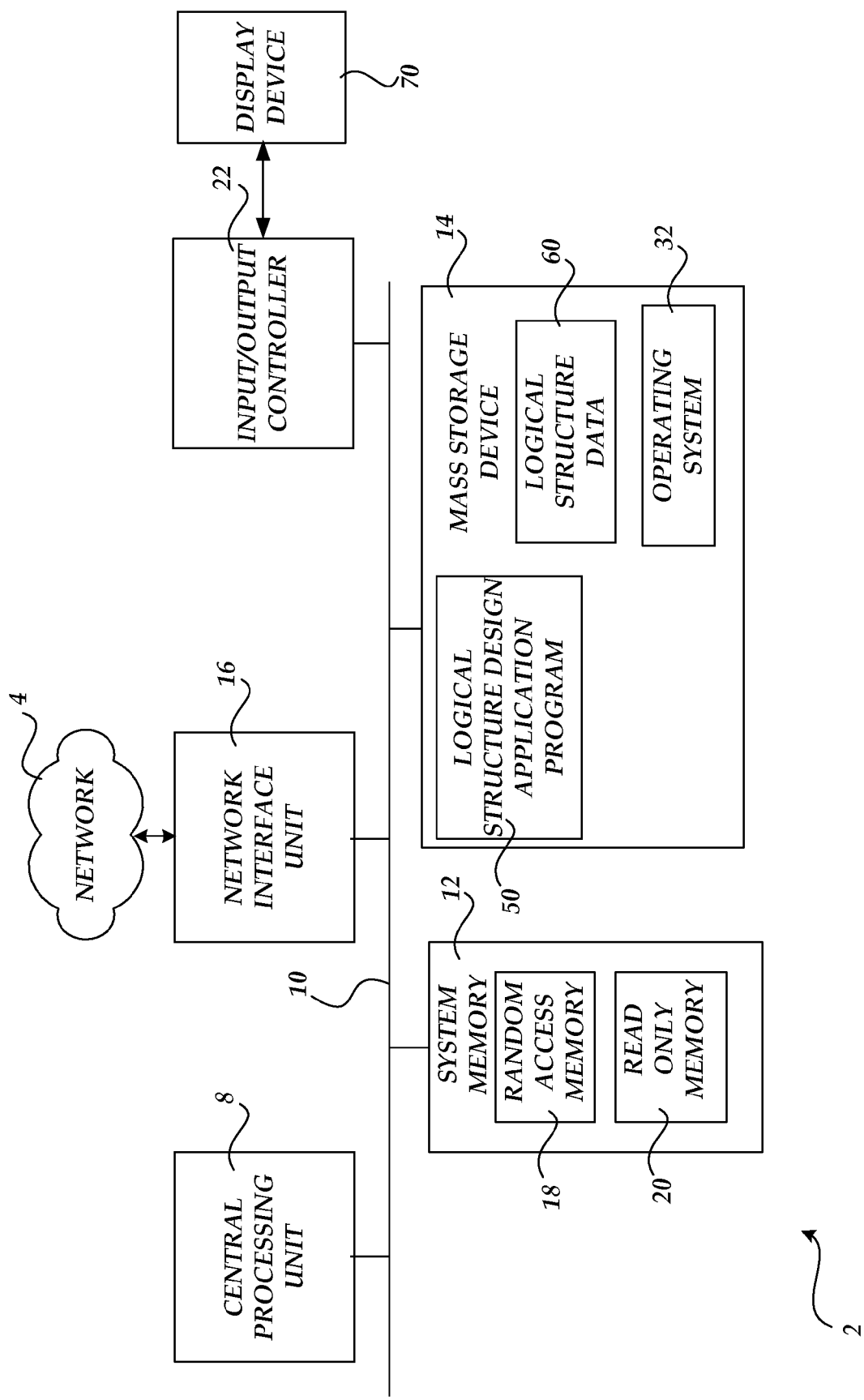
FIG. 1 is a block diagram illustrating a computing environment which may be utilized for displaying logical surface components for designing logical structures, in accordance with various embodiments.

Embodiments are provided for displaying logical surface components for visually designing logical structures or macros. In one embodiment, a first logical surface component is displayed which may include a design surface. The design surface may be utilized to display data which make up one or more macros. The design surface may be selected for receiving logical structure or macro data. The received data, which represents a design of one or more logical structures or macros, may then be displayed in the design surface on a display device. In another embodiment, controls for navigating within logical surface components utilized for designing one or more logical structures or macros may be displayed on a display device. A logical surface component which includes a hierarchical grouping of logical surface or macro actions may be displayed. One or more actions may be selected and an instruction may be received in a visual interface to move the selected actions from an original location among the hierarchical grouping to a second location among the hierarchical grouping. In response to receiving the move instruction, the selected actions at the second location may be displayed.

Referring now to the drawings, in which like numerals represent like elements, various illustrative embodiments will now be described.

Exemplary Operating Environment

Referring now to FIG. 1, the following discussion is intended to provide a brief, general description of a suitable computing environment in which various illustrative embodiments may be implemented. While various embodiments will be described in the general context of program modules that execute in conjunction with program modules that run on an operating system on a personal computer, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with other computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 1 shows a computer 2 which may include a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, a logical structure design application 50, and logical structure data 60. In accordance with various embodiments, the operating system 32 may be suitable for controlling the operation of a networked personal computer, such as the WINDOWS operating systems from MICROSOFT CORPORATION of Redmond, Wash. The logical structure design application 50 may comprise the ACCESS database creation and management desktop application program, also from MICROSOFT CORPORATION of Redmond, Wash. It should be understood that, in accordance with an embodiment, the logical structure design application 50 may be utilized to design logical structures or macros for automating various tasks associated with creating and managing databases. For example, a user may design a macro to test the security of a database project file. The security-based macro may be utilized to verify whether a database project is trusted and, if the project is not trusted, the macro may automatically stop further execution. The logical structure data 60 may comprise macro data utilized by the logical structure design application 50 to design macros. In accordance with various embodiments, the logical structure data 60 may include, but is not limited to macro arguments and macro actions. It should be understood that throughout the following detailed description and the appended claims, logical structures, logical structure data, logical structure arguments, and actions may be interchangeably referred to as macros, macro data, macro arguments and macro actions.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network or a wide area network (e.g., the Internet), for example. The computer 2 may connect to the network 4 through a network interface unit 16 connected to the bus 10. It should be appreciated by those skilled in the art that when operating in a networked environment, the computer 2 may be in communication with one or more remote servers hosting a shared database services platform such as the EXCEL/ACCESS SERVICES platform from Microsoft Corporation of Redmond, Wash. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display device 70, a printer, or other type of output device. Additionally, a touch screen can serve as an input and an output mechanism.

As mentioned briefly above, a number of program modules and data files may be stored in the mass storage device 14 and RAM 18 of the computer 2 such as the operating system 32. The mass storage device 14 and RAM 18 may also store one or more program modules. In particular, the mass storage device 14 and the RAM 18 may store the logical structure design application 50 and the logical structure data 60.

Figure 2:
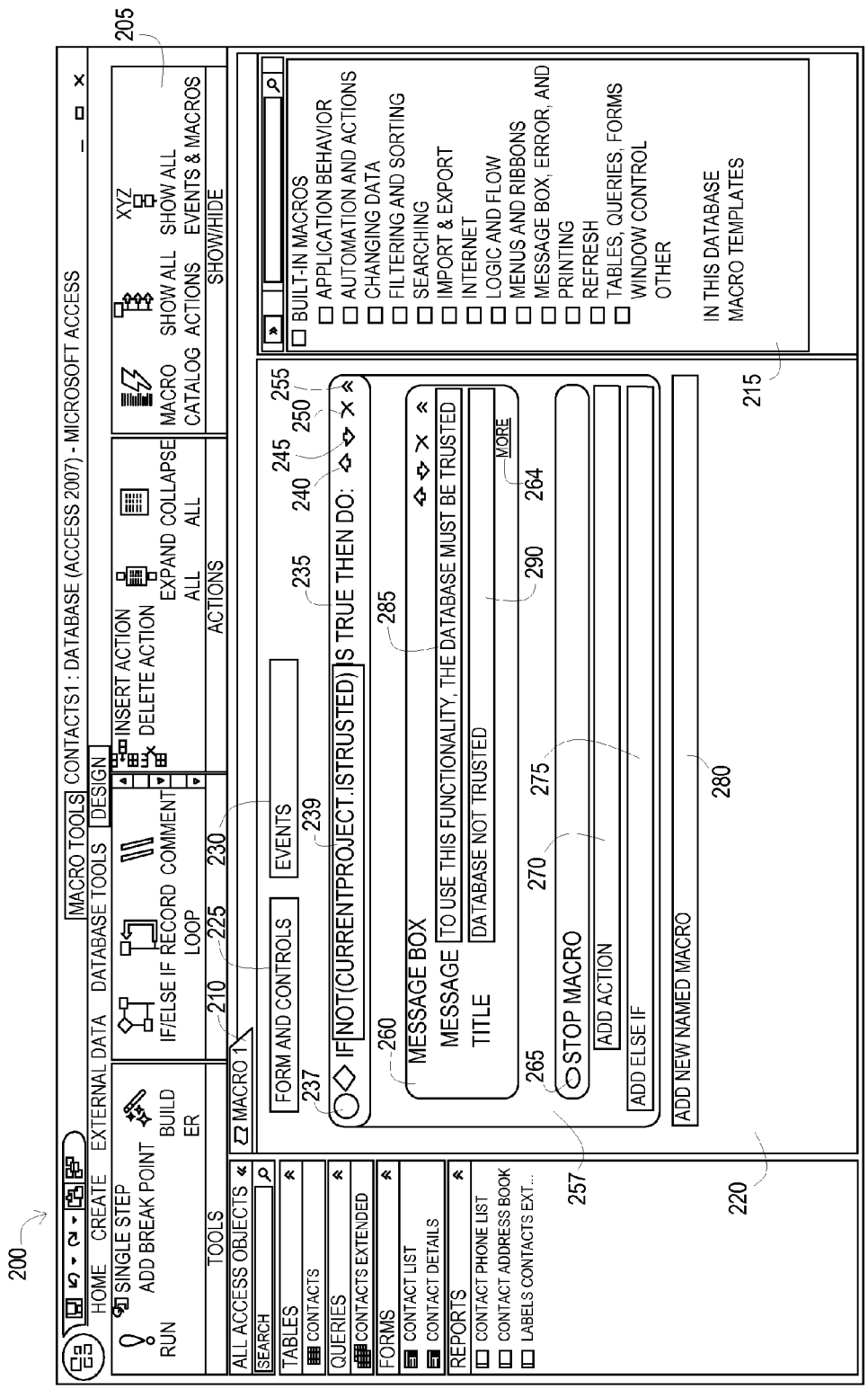
FIG. 2 is an illustrative computer screen display of a logical structure in the design surface, in accordance with one embodiment.

FIG. 2 is an illustrative computer screen display of a logical structure design surface 200 generated by the logical structure design application 50 which may be utilized design logical structures or macros, in accordance with one embodiment. The logical structure design surface 200 includes various components which may be utilized in designing logical structures including a ribbon component 205, a logical structure object tab 210, a catalog 215, and a design surface 220.

The ribbon component 205 may comprise a command user interface for displaying selective functionality controls utilized in the creation and execution of logical structures. The logical structure object tab 210 may be utilized to represent and display the name of a currently open logical structure document (e.g., "Macro1") and as the scope of the logical structure is changed (which will be described in greater detail below with respect to the design surface 220), the logical structure design application 60 may update the logical structure object tab 210 to display the change in scope. The catalog 215 may be utilized to display a list of logical structures, actions, and templates which may be selected by a user for insertion and editing in the design surface 220. In particular, and in accordance with various embodiments, the catalog 215 may comprise a drag and drop interface for displaying available actions which are within the context of a currently displayed logical structure in the design surface 220. It should be appreciated that a user may utilize the catalog 215 to either enter text in the search box portion of the catalog 215 to search for the available actions or alternatively, select a desired available action to drag from the catalog 215 onto the design surface 220. The design surface 220 may include a control subcomponent 225 and an event subcomponent 230. In accordance with one embodiment, the control subcomponent 225 may comprise a dropdown menu from which the logical structure design application 50 receives a selection of menu entries for editing logical structures or macros. The control subcomponent 225 will be discussed in greater detail below with respect FIG. 3. The event subcomponent 230 may comprise a dropdown menu from which the logical structure design application 50 receives a selection of a named logical structure or the selection of an event that is associated with a named macro, from a set of menu entries.

The design surface 220 may also include a title bar 235 and a logic flow element 257. The title bar 235 may be utilized to display a step number 237 identifying a current step in the logical structure or macro, a clause 239 (e.g., "Not(CurrentProject.IsTrusted)") which is an expression that evaluates the safety level of the current database, move up button 240 and move down button 245 which may be utilized to move the title bar 235 and the logic flow element 257 up or down, a delete button 250 which may be utilized to delete selected actions 260 and 265 within the design surface 220, and an expand/collapse button 255 which may be utilized to expand or collapse the logic flow element 257 into or out of the title bar 235. As will be discussed in greater detail herein, the logic flow element 257 may be utilized to display one or more actions 260 and 265 associated with the logical structure identified in the title bar 235. Each of the actions 260 and 265 may themselves comprise move and expand/collapse buttons. Thus, utilizing the move buttons 240 and 245 may move the title bar 235 as well as any actions (i.e., children) within the logic flow element 257. Similarly, utilizing the expand/collapse button 255 may show or hide a group of actions within the logic flow element 257. It should be understood that when expanding the logic flow element 257, the logical structure design application 50 may be configured to remember which individual actions or children were in a collapsed or expanded state when the logic flow element 257 was previously collapsed. It will be appreciated that, in accordance with various embodiments, the logical structure design application 50 may be configured to enable drag drop functionality in the design surface 220 such that any action may be dragged to any insertable location (such as to a different location within the logic flow element 257). The logical structure design application 50 may also be configured to shift other displayed action containers to make room for dropping a dragged action container.

The logic flow element 257 may include one or more actions such as the actions 260 and 265 which may comprised executable program statements for causing the occurrence of an event programmatically. The action 260 displays an action name (i.e., "Message Box") and parameters, including arguments 285 and 290 and a More link 264. The arguments 285 and 290 provide variables which may be required by the action 260 to execute properly. It will be appreciated that the arguments 285 and 290 may be edited and managed directly from within the action 260. It will further be appreciated that, in accordance with various embodiments, the arguments 285 and 290 may be partially entered by a user in the action 260 and automatically completed by the logic surface design application 50. In accordance with one embodiment, the More link 264 may be utilized to hide redundant, unsafe, obfuscated or legacy logical structure arguments. The action 265 displays a single step action name (i.e., "Stop Macro"). Similar to the title bar 235 discussed above, the action 260 may comprise an expand/collapse button. In accordance with one embodiment, collapsing the action 260 results in the arguments 285 and 290 being displayed in the collapsed logic flow element 257. The logic flow element 257 may also include edit containers, including, but not limited to, Add Action edit container 270 for adding an additional action from the catalog 215, to the logical structure identified in the title bar 235, Add Else If edit container 275 for adding an additional branch to an existing logic flow within a logic structure, and Add Named Macro container 280 for adding a new logical structure or macro subroutine. It should be understood that additional edit containers may also be displayed in the logic flow element 257 such as an Add Else container, for example.

Figure 3:
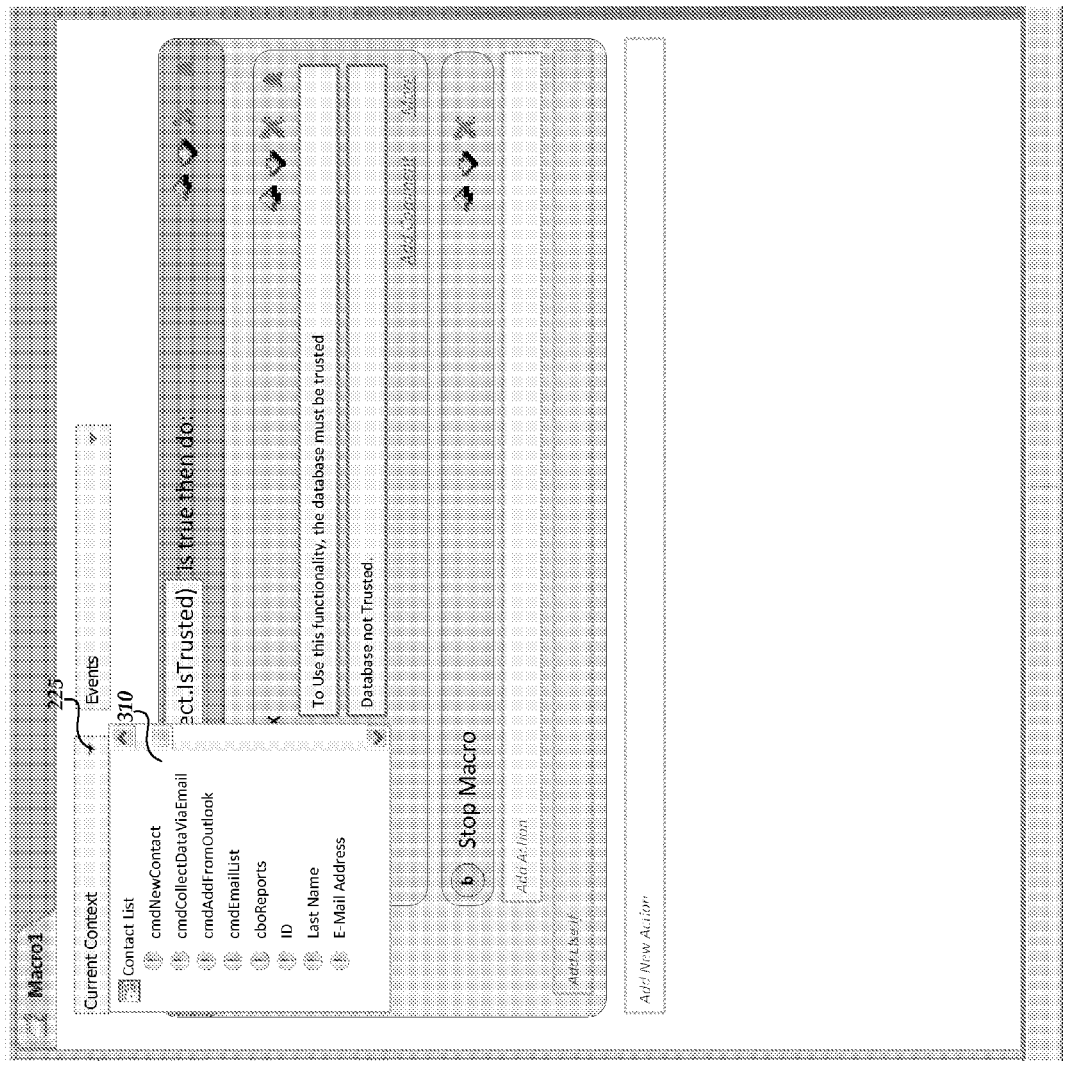
FIG. 3 is an illustrative computer screen display of a control subcomponent dropdown menu in a logical structure design surface, in accordance with one embodiment.

FIG. 3 is an illustrative computer screen display of the control subcomponent 225 generated by the logical structure design application 50 in the logical structure design surface 200, in accordance with one embodiment. As discussed above with respect to FIG. 2, the control subcomponent 225 may comprise a set of menu entries for editing logical structures or macros. As shown by the illustrative control subcomponent 225, a dropdown menu 310 of available macros for a currently selected is shown with menu entries including commands and other data related to contact information.

Figure 4:
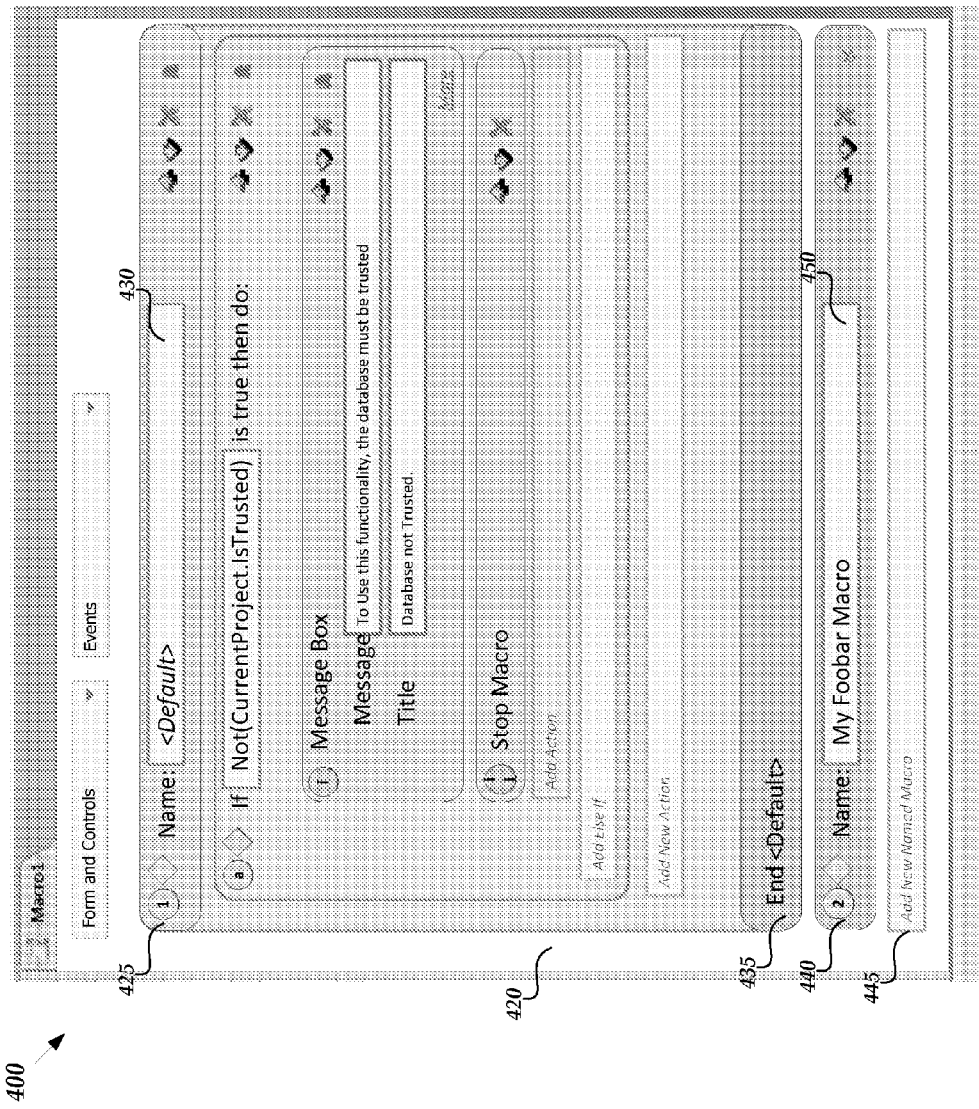
FIG. 4 is an illustrative computer screen display of a logical structure design surface which may be utilized for naming subroutines, in accordance with one embodiment.

FIG. 4 is an illustrative computer screen display 400 of a logical structure design surface 420 which may be utilized for naming subroutines, in accordance with one embodiment. The design surface 420 includes title bars 425 and 440. The title bar 425 may be utilized to display a default "name space" for the displayed macro in form field 430. The title bar 440 may be used to receive a user declared name for the macro in form field 450. In accordance with various embodiments, named macros may be contained within a macro object (either a data object or a user interface object) or within a table macro. Named macros act as subroutines, functionally separating themselves from the whole with their names. It should be understood that the default "name space" is executable outside the declared names for a macro. For example, the default name space for the macro shown in the design surface 420 displays the name <Default> in the form field 430. In accordance with various embodiments, the name <Default> may not be edited. The <Default> name space may also have an End title bar (i.e., End <Default>) 435. Named macros may then follow after the default name space (e.g., the macro name "My Foobar Macro" displayed in the title bar 440 follows after the <Default> name space shown in the title bar 425. Named macros may also have an End title bar (not shown) which may have a display format of "End <Name>". Additional macro names may also be declared below previously named macros as shown by the Add New Named Macro text box 445. In accordance with various embodiments, table macros (not shown) may include events and named macros but do not have a default name space.

Figure 5:
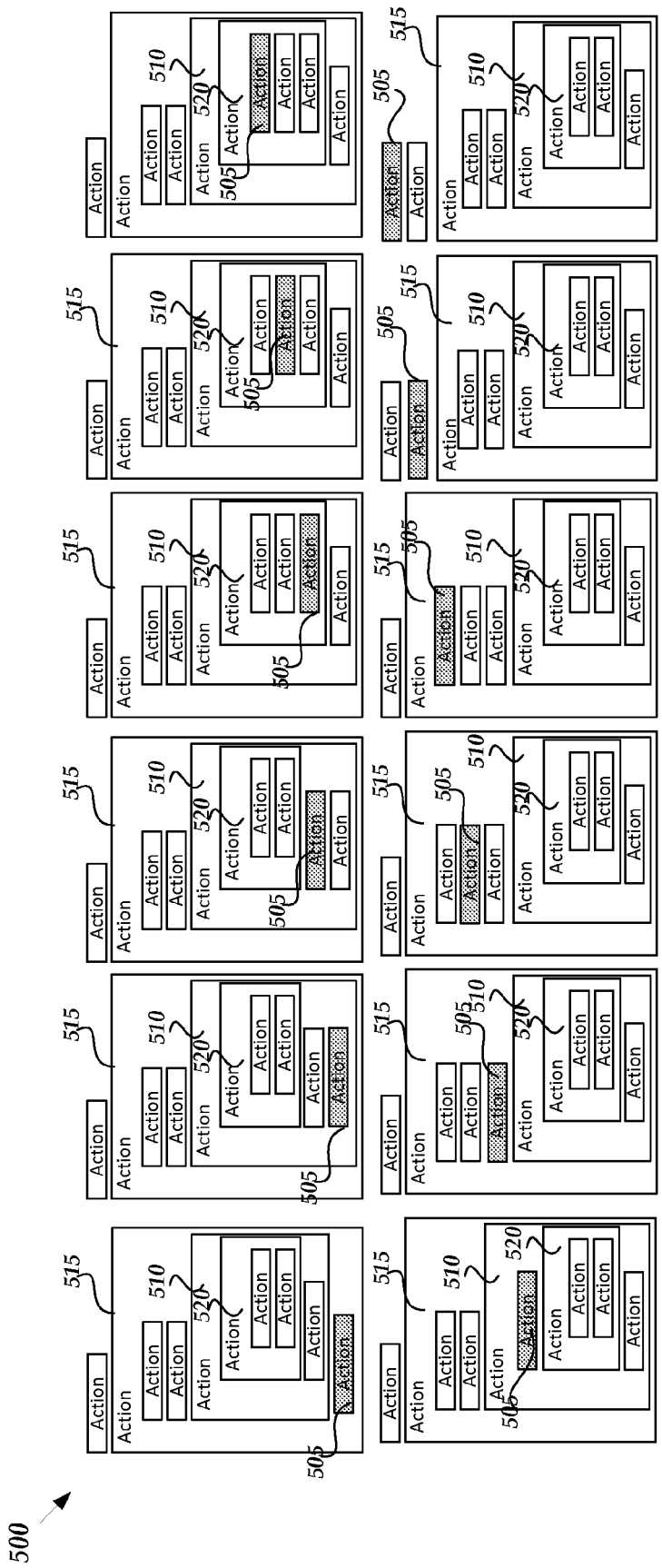
FIG. 5 is a block diagram illustrating navigating within a logical surface component utilized for designing one or more logical structures, in accordance with one embodiment.

FIG. 5 is a block diagram 500 illustrating the navigation of actions within a logical surface component, in accordance with one embodiment. In response to the selection of one or more actions 505 and a move instruction (e.g., via a keyboard instruction or the selection of the move buttons in an action container which were discussed with respect to FIG. 2), the logical structure design application 50 may be configured to navigate a selected action 505 to different locations within a hierarchical grouping of actions 515. For example, as shown in FIG. 5, a selected action 505 may be moved from within the group 515 to the bottom most position inside of subgroup 510. From within the subgroup 510, a selected action 505 may be moved from to the sub-subgroup 520. From within the sub-subgroup 520, a selected action 505 may be moved to a higher position in the hierarchy of actions within the sub-group 510. From within the subgroup 510, a selected action 505 may be moved to a higher position in the hierarchy of actions within the group 515. Finally, from within the group 515, a selected action may be moved to outside of the hierarchy of groups and subgroups 515, 510, and 520. It should be understood that in accordance with an embodiment, the movement of a single action (i.e., a node) described above may apply to one or more contiguous actions. In particular, multiple actions may be selected and moved simultaneously as if they were all selected as a single node. When receiving a move instruction involving multiple actions, the logical structure design application 50 will tie selected actions to the bottom most selected item, will order the selected actions next to each other, and then move the selected actions.

Figure 6:
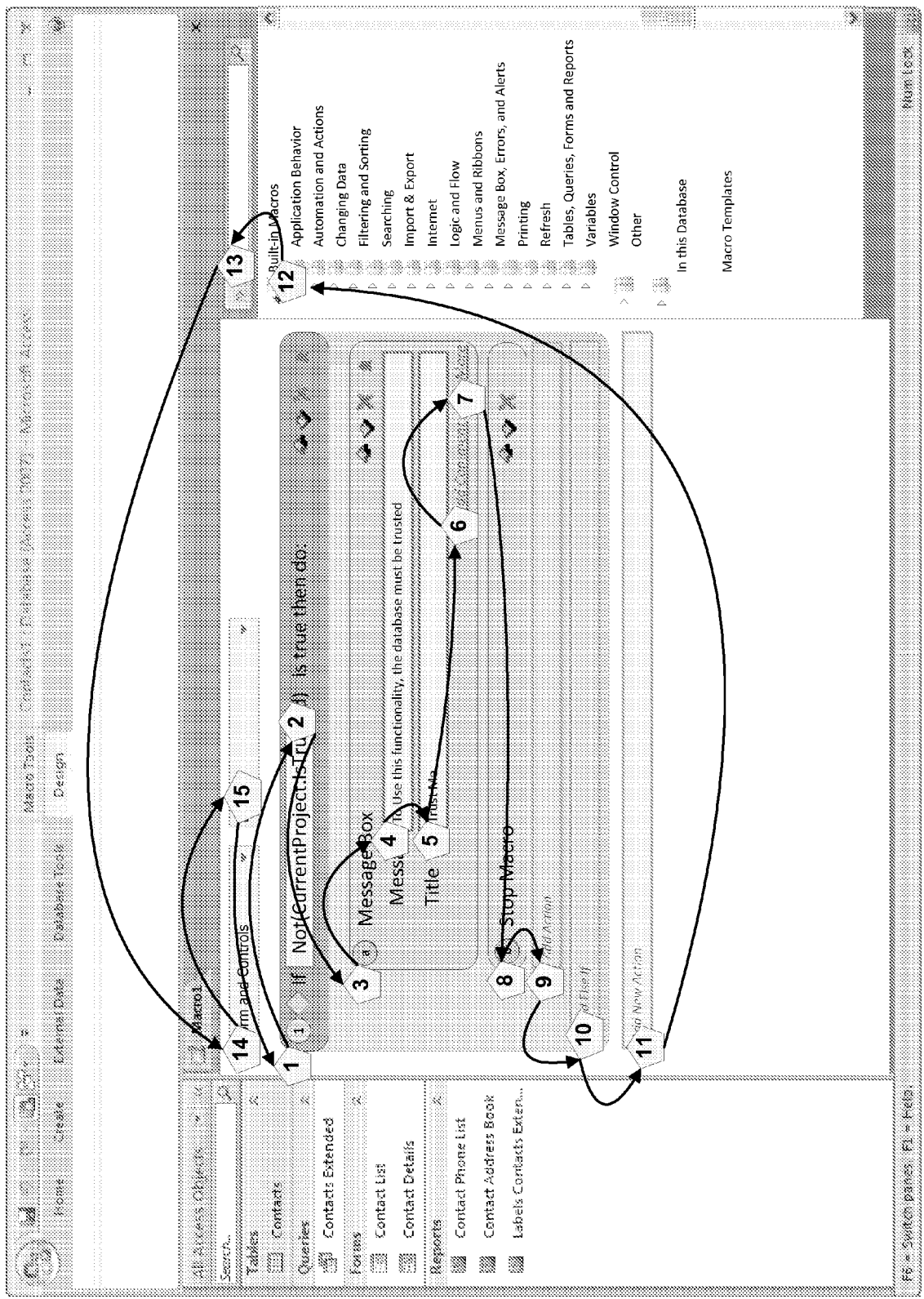
FIG. 6 is a screenshot diagram illustrating navigating among logical surface elements and sub-elements within a logical surface component and navigating between logical surface components and subcomponents in a logical structure design surface, in accordance with one embodiment.

FIG. 6 is a screenshot diagram illustrating navigating among logical surface elements and sub-elements within a logical surface component and navigating between logical surface components and subcomponents in the logical structure design surface 200, in accordance with one embodiment. The logical structure design application 50 may be configured to navigate or tab within the logical structure design surface 200 in a predetermine order. In particular, in accordance with one embodiment, the tab order may begin from a selected logical element (e.g., the IF statement) in the design surface 220 and progress into the title bar 235 and the logic flow element 257. Within the logic flow element 257, the tab order navigates from the displayed arguments through the displayed action container hierarchy and edit containers before progressing to the catalog 215 and finally to the control and edit subcomponents 225 and 230.

Figure 7:
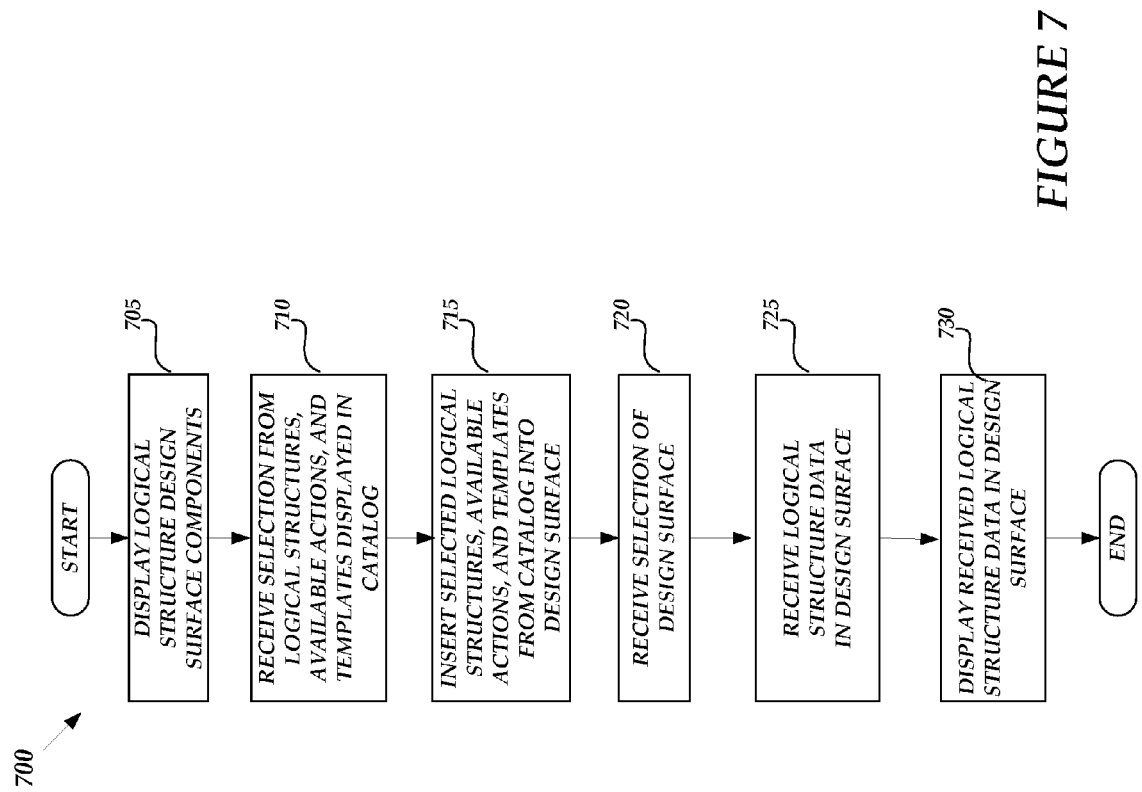
FIG. 7 is a flow diagram illustrating a routine for displaying logical surface components for designing logical structures, in accordance with one embodiment.

FIG. 7 is a flow diagram illustrating a routine 700 for displaying, on a display, device logical surface components for designing one or more logical structures, in accordance with an embodiment. The components of FIGS. 1 and 2 are referred to in the description of FIG. 7, but the embodiment is not so limited. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 7 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 700 begins at operation 705, where the logical structure design application 50 executing on the computer 2 causes the display of logical structure design surface components such as the ribbon component 205, the logical structure object tab 210, the catalog 215, and the design surface 220 discussed above with respect to FIG. 2. From operation 705, the routine 700 continues to operation 710, where the logical structure design application 50 receives a selection of logical structures, available actions, and/or templates from the catalog 215.

From operation 710, the routine 700 continues to operation 715, where the logical structure design application 50 inserts the selected logical structures, available actions, and/or templates from the catalog 215 into the design surface 220. In particular, the logical structure design application 50 may insert the selected logical structures, available actions, and/or templates by performing a dragging operation in response to receiving a drag instruction from a user. In inserting the selected logical structures, available actions, and/or templates from the catalog 215, the logical structure design application 50 may display the step number and the name of a selected logical structure in the title bar 235 and further display logical structure arguments and actions associated with the selected logical structure within the logic flow element 257.

From operation 715, the routine 700 continues to operation 720, where the logical structure design application 50 receives a user selection of the design surface 220 for entering additional logical structure data such as additional actions, logic flow braches, or new logical structure or macro subroutines. From operation 720, the routine 700 continues to operation 725, where the logical structure design application 50 receives logical structure data in the design surface 220. In particular, the logical structure design application 50 may receive additional actions in one or more, Add Action edit container 270, additional logic flow branches in one or more Add Else If (or Add Else) edit containers 275, and additional macro subroutines in one or Add Named Macro containers 280.

From operation 725, the routine 700 continues to operation 730, where the logical structure design application 50 displays the received logical structure data in the design surface 220. From operation 730 the routine 700 then ends.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method in a computer system for displaying on a display device a plurality of logical surface components for designing one or more logical structures, comprising:

displaying, by the computer system, a first logical surface component, the first logical surface component comprising a design surface, the design surface being utilized to display logical structure data;

receiving, by the computer system, a selection of the design surface;

receiving, by the computer system, the logical structure data in the design surface;

displaying, by the computer system, the received logical structure data in the design surface, the displayed logical structure data representing a design of the one or more logical structures;

displaying a second logical surface component in proximity to the design surface, the second logical surface component comprising a catalog, the catalog comprising the one or more logical structures, the catalog further comprising one or more available actions and one or more logical structure templates;

receiving a selection of at least one of the one or more logical structures, the one or more available actions, and the one or more logical structure templates from the catalog;

in response to receiving the selection of the at least one of the one or more logical structures, the one or more available actions, and the one or more logical structure templates from the catalog, inserting the selected at least one of the one or more logical structures, the one or more available actions, and the one or more logical structure templates into the design surface for display, the one or more available actions comprising executable program statements for causing the occurrence of an event programmatically; and displaying the one or more available actions in the design surface, the one or more available actions displaying arguments and a hyperlink, the hyperlink being utilized to hide one or more of redundant, unsafe, obfuscated and legacy logical structure arguments.

2. The method of claim 1, wherein displaying a first logical surface component comprises:

displaying a logic flow element in the design surface;

displaying a control subcomponent in the design surface, the control subcomponent being utilized for:

receiving a selection in a dropdown menu comprising a set of menu entries for editing the one or more logical structures;

displaying the set of menu entries in response to receiving the menu selection; and receiving a user selection of a menu entry from the set of menu entries, and, in response to the user selection, performing an editing command associated with the selected entry; and displaying an event subcomponent, the event subcomponent being utilized for receiving a selection in a dropdown menu comprising a set of menu entries, the set of menu entries comprising a set of logical structure names and events associated with the set of logical structure names.

3. The method of claim 1 further comprising displaying a logical structure object tab in the design surface, the logical structure object tab being utilized for:

displaying the name of a currently open logical structure in the design surface;

determining when a scope of the of the currently open logical structure has changed; and updating the display of the currently open logical structure name based on the change in scope.

4. The method of claim 1 further comprising displaying a title bar above the displayed one or more available actions in the design surface, the title bar comprising each of the following: a step number identifying a step within a named logical structure, at least one icon representing at least one of the one or more logical structures, at least one move button for moving at least the title bar in one or more directions, a delete button for deleting one or more actions, and a collapse/expand button for collapsing and expanding the logic flow element.

5. The method of claim 4 further comprising displaying the one or more actions within the displayed logic flow element, the one or more actions comprising executable program statements.

6. The method of claim 1, wherein the catalog comprises a drag and drop interface and wherein inserting the selected at least one of the one or more logical structures, the one or more available actions, and the one or more logical structure templates into the first logical surface component for display comprises receiving a drag instruction to drag the selected at least one of the one or more logical structures, the one or more available actions, and the one or more logical structure templates onto the design surface.

7. A system for navigating within logical surface components utilized for designing one or more logical structures, comprising:

a memory for storing executable program code; and a processor, functionally coupled to the memory, the processor being responsive to computer-executable instructions contained in the program code and operative:

to receive a selection of at least one action in a first logical surface component comprising a hierarchical grouping of actions, the at least one action comprising executable program statements for causing the occurrence of an event programmatically;

to receive an instruction to move the selected at least one action from a first location among the hierarchical grouping of actions to a second location among the hierarchical grouping of actions;

in response to receiving the move instruction, displaying the selected at least one action at the second location among the hierarchical group of actions, the display of the selected at least one action comprising the display of at least one argument, wherein the at least one argument is edited and managed directly within the at least one action; and display the at least one actions in a design surface, wherein the at least one action displays arguments and a hyperlink, the hyperlink being utilized to hide one or more of redundant, unsafe, obfuscated and legacy logical structure arguments: and further operative: to display a second logical surface component in proximity to the first logical surface component, the second logical surface component comprising a catalog; and to navigate from at least one selected logical surface element displayed in the first logical surface component to at least one logical surface sub-element displayed in the first logical component to the catalog displayed in the second logical surface component to a control subcomponent displayed in the first logical surface component to an event subcomponent displayed in the first logical surface component to the at least selected logical surface element.

8. The system of claim 7, wherein the processor in receiving an instruction to move the selected at least one action from a first location among the hierarchical grouping of actions to a second location among the hierarchical grouping of actions comprises receiving an instruction to move a plurality of selected actions in at least one of a first direction, wherein the plurality of selected actions are tied to a top most selected action in the hierarchical grouping, and a second direction, wherein the plurality of selected actions are tied to a bottom most selected action in the hierarchical grouping.

9. The system of claim 8, wherein the processor is further operative to order each of the plurality of selected actions next to each other.

10. The system of claim 7, wherein the processor in navigating from at least one selected logical surface element, is operative to navigate from at least one logical surface argument.

11. The system of claim 7, wherein the processor in navigating to at least one logical surface sub-element, is operative to navigate to at least one action in the hierarchical grouping of actions.

12. The system of claim 7, wherein the processor in receiving a selection of at least one action in the hierarchical grouping of actions is operative to receive a selection of at least one of a message text box and a stop macro text box.

13. A computer-readable storage device containing computer executable instructions which, when executed on a computer, will cause the computer to perform a method for displaying on a display device a plurality of logical surface components for designing one or more logical structures, comprising:

displaying a first logical surface component, the first logical surface component comprising a design surface, the design surface being utilized to display logical structure data, the logical structure data comprising the one or more logical structures;

receiving a selection of the design surface;

receiving the logical structure data in the design surface;

displaying the received logical structure data in the design surface, the displayed logical structure data representing a design of the one or more logical structures;

displaying a second logical surface component in proximity to the design surface, the second logical surface component comprising a catalog, the catalog comprising the one or more logical structures, the catalog further comprising one or more available actions and one or more logical structure templates;

receiving a selection of at least one of the one or more logical structures, the one or more available actions, and the one or more logical structure templates from the catalog;

in response to receiving the selection of the at least one of the one or more logical structures, the one or more available actions, and the one or more logical structure templates from the catalog, inserting the selected at least one of the one or more logical structures, the one or more available actions, and the one or more logical structure templates into the design surface for display, the one or more available actions comprising executable program statements for causing the occurrence of an event programmatically, the display of the one or more available actions comprising the display of at least one argument, wherein the at least one argument is edited and managed directly within the one or more available actions;

receiving a selection of at least one of the displayed plurality of selectable functionality controls;

in response to receiving a selection of the at least one of the displayed plurality of selectable functionality controls, inserting the logical structure elements into the first logical surface component for display;

displaying the one or more available actions in the design surface, the one or more available actions displaying arguments and a hyperlink, the hyperlink being utilized to hide one or more of redundant, unsafe, obfuscated and legacy logical structure arguments.

14. The computer-readable storage device of claim 13, wherein displaying a first logical surface component comprises:

displaying a logic flow element in the design surface; and displaying a control subcomponent in the design surface, the control subcomponent being utilized for:

receiving a selection in a dropdown menu comprising a set of menu entries for editing the one or more logical structures;

displaying the set of menu entries in response to receiving the menu selection; and receiving a user selection of a menu entry from the set of menu entries, and, in response to the user selection, performing an editing command associated with the selected entry.

15. The computer-readable storage device of claim 14, wherein displaying a first logical surface component further comprises:

displaying an event subcomponent, the event subcomponent being utilized for receiving a selection in a dropdown menu comprising a set of menu entries, the set of menu entries comprising a set of logical structure names and events associated with the set of logical structure names; and displaying a logical structure object tab, the logical structure object tab being utilized for:

displaying the name of a currently open logical structure in the design surface;

determining when a scope of the of the currently open logical structure has changed; and updating the display of the currently open logical structure name based on the change in scope.

16. The computer-readable storage device of claim 13 further comprising displaying a title bar above the one or more available actions in the design surface, the title bar comprising each of the following: a step number identifying a step within a named logical structure, at least one icon representing at least one of the one or more logical structures, at least one move button for moving at least the title bar in one or more directions, a delete button for deleting one or more actions, and a collapse/expand button for collapsing and expanding the logic flow element.

17. The computer-readable storage device of claim 16 further comprising displaying the one or more actions within the displayed logic flow element, the one or more actions comprising executable program statements.

18. The computer-readable storage device of claim 13, wherein displaying a first logical surface component comprises displaying an area utilized to display database macro data.

19. The method of claim 1, wherein the display of the one or more available actions comprises displaying at least one argument, wherein the at least one argument is edited and managed directly within the one or more available actions.

* * * * *